(12) United States Patent
Chehaibar

(10) Patent No.: US 10,338,926 B2
(45) Date of Patent: Jul. 2, 2019

(54) PROCESSOR WITH CONDITIONAL INSTRUCTIONS

(71) Applicant: BULL SAS, Les Clayes-sous-Bois (FR)

(72) Inventor: Ghassan Chehaibar, Guyancourt (FR)

(73) Assignee: BULL SAS, Les Clayes-sous-Bois (FR)

( * ) Notice: Subject to any disclaimer, the term of this patent is extended or adjusted under 35 U.S.C. 154(b) by 527 days.

(21) Appl. No.: 14/716,245

(22) Filed: May 19, 2015

(65) Prior Publication Data

US 2015/0339122 A1 Nov. 26, 2015

(30) Foreign Application Priority Data

May 20, 2014 (FR) ..................................... 14 54511

(51) Int. Cl.
*G06F 9/30* (2018.01)

(52) U.S. Cl.
CPC ...... *G06F 9/30181* (2013.01); *G06F 9/30058* (2013.01); *G06F 9/30072* (2013.01); *G06F 9/30145* (2013.01)

(58) Field of Classification Search
CPC ............. G06F 9/30145; G06F 9/30072; G06F 9/30058
See application file for complete search history.

(56) References Cited

U.S. PATENT DOCUMENTS 6,009,512 A * 12/1999 Christie .............. G06F 9/30072
712/218
6,260,082 B1 * 7/2001 Barry .................... G06F 13/126
710/22
2004/0030860 A1 * 2/2004 Wang .................. G06F 9/30072
712/24
2004/0250051 A1 * 12/2004 Seal ..................... G06F 9/30072
712/226
2006/0149953 A1 * 7/2006 Wilson ................ G06F 9/30014
712/245

(Continued)

FOREIGN PATENT DOCUMENTS

| EP | 1 267 257 A2 | 12/2002 |
| GB | 2 315 890 A | 2/1998 |
| GB | 2 352 536 A | 1/2001 |

OTHER PUBLICATIONS

K. S. Hemmert, K. D. Underwood and A. Rodrigues, "An architecture to perform NIC based MPI matching," 2007 IEEE International Conference on Cluster Computing, Austin, TX, 2007, pp. 211-221. teaches predication used for MPI Matching.*

(Continued)

*Primary Examiner* — Eric Coleman
(74) *Attorney, Agent, or Firm* — Pillsbury Winthrop Shaw Pittman LLP

(57) ABSTRACT

A computer implemented method for processing machine instructions by a physical processor, includes receiving a machine instruction, stored in a memory, to execute, the machine instruction including an identification of at least one first operation to execute and a conditional prefix representing a condition to verify to execute the at least one first operation; evaluating, using a management module, the prefix, and executing, using a processing unit, the at least one first operation identified in the machine instruction, according to whether the condition is verified or not.

15 Claims, 4 Drawing Sheets

(56) References Cited

U.S. PATENT DOCUMENTS

| | | | |
|---|---|---|---|
| 2008/0016320 A1* | 1/2008 | Menon | G06F 9/30014 |
| | | | 712/22 |
| 2010/0077183 A1* | 3/2010 | Gonion | G06F 9/3887 |
| | | | 712/216 |
| 2010/0115249 A1* | 5/2010 | Paltashev | G06F 9/30087 |
| | | | 712/228 |
| 2013/0246552 A1* | 9/2013 | Underwood | G06F 15/167 |
| | | | 709/212 |
| 2017/0091064 A1* | 3/2017 | Gschwind | G06F 11/362 |

OTHER PUBLICATIONS

Preliminary Search Report as issued in French Patent Application No. 1454511, dated Mar. 6, 2015.

* cited by examiner

| | T1 | T2 | T3 | T4 | T5 | T6 | T7 | T8 | T9 | T10 | T11 | T12 | T13 | T14 | T15 | T16 |
|---|---|---|---|---|---|---|---|---|---|---|---|---|---|---|---|---|
| 1: FTCH | A | B | C | D | E | F | G | H | I | ✗←O | P | Q | R | S | T | U |
| 2: VD | | A | B | C | D | E | F | G | H | I | O | P | Q | R | S | T |
| 3: ECC CHCK | | | A | B | C | D | E | F | G | H | | O | P | Q | R | S |
| 4: DECOD | | | | A | B | C | D | E | F | G | | | O | P | Q | R |
| 5: RD | | | | | A | B | C | D | (E) | F | | | | O | P | Q |
| 6: EXE | | | | | | A | B | C | D | ✗ | | | | | O | P |
| 7: RW | | | | | | | A | B | C | D | | | | | | O |

Fig. 2

BRNCH

PROCESSOR WITH CONDITIONAL INSTRUCTIONS

CROSS-REFERENCE TO RELATED APPLICATIONS

This application claims priority to French Application No. 1454511, filed May 20, 2014, the content of which is incorporated herein by reference in its entirety.

FIELD

This invention concerns the field of processors for computing devices. Specifically, it concerns processors dedicated to implementing item searches in lists.

BACKGROUND

Certain types of computing devices, such as network interface cards supporting the MPI (Message Passing Interface) interface, require extensive implementation of item searches in lists.

It involves, for example, listing the messages expected by a communication network node with an indication of their respective storage spaces and comparing all of the node's incoming messages with those on the list. Thus, when a message arrives, it can be sent to its storage space to be processed.

Traditionally, each incoming message has a label that must be compared to the label of the messages in the list. The labels of the messages in the list may be masked so that the comparison of labels is performed on a reduced number of bits.

When a message arrives, its label is compared to that of the first item in the list, then the second, then the third, and so on, until a matching label is found.

When this happens, the incoming message is sent to the storage space, and the matching item in the list is deleted. The list is then updated.

The list of expected messages is therefore a list that is dynamically modified with items that can be removed (when a corresponding message arrives) or added (when a new message is expected).

The implementation of this type of search requires the execution of complex path and list management algorithms. In addition, these algorithms are usually implemented with a large number of options to manage.

As a result, in computing devices, particularly MPI-type interfaces, a processor dedicated to this type of operation is required. With a dedicated processor, searching items in a list (or matching, as it is also called) can be managed using software and not hardware. This offers greater flexibility because the computer code directing the processor (also known as microcode or firmware) can evolve to reflect modifications to the interface specification, for example.

To obtain top performance from a processor, its execution time, and therefore its operating cycles, should be reduced. The process execution time in the processor impacts the flow of messages managed by the interface.

The writing of firmware by developers should also be facilitated. Firmware is written in assembly language and therefore does not go through the high-level control structures offered by other types of language. An assembly code writing error can have serious and direct consequences on the processor, with no hope of controlling the error.

It may also be desirable to keep machine instructions performed by the processor to a reasonable size.

The document by Hemmert et al, "*An architecture to perform NIC Based MPI Matching*" discloses a processor based on predicates to control the flow of machine instructions executed. The machine instructions are executed according to the values stored in predicate registers that store logical combinations (of the AND and OR type) of comparison results (bit to bit). The predicate registers represent the conditions to fulfill for the instructions to be executed.

In this document, flow is controlled by branch instructions according to the value of one predicate register bit. As known, a branch consists in not executing a part of a sequential suite of instructions, by not executing a next instruction in the code, but by passing directly to a previous or later instruction in the code. The branch can therefore by done forward or backward in the computer code.

To extract the execution options from the instructions, the comparisons are made by a ternary comparison unit (NALU), which compares two values with a compare mask.

However, this type of processor has a number of drawbacks.

For example, the number of cycles necessary to execute a code is high. This is mainly due to the widespread use of branching as a means of control. This document calls for a number of two cycles to create a branch. However, in this case, it is a study processor with access to the memory in a single cycle and without an error connection code (of the ECC type, for example). Such a processor cannot be used realistically in industrial applications. In industrial applications, a number of five cycles is generally necessary to execute a connection.

Furthermore, the processor shown uses a classic arithmetic unit (ALU) and a ternary arithmetic unit (TALU). It is therefore not possible to perform parallel calculation, which does not optimize the size of the instructions, which is, however, 164 bits, which normally allows parallel instructions to be executed.

SUMMARY

There is therefore a need to improve the processors of the prior art, particularly those dedicated to the search for matching items in lists.

A first aspect of the invention concerns a procedure or a computer implemented method for processing machine instructions by a physical processor, comprising:
  receiving a machine instruction to execute, the machine instruction comprising the identification of at least one first operation to execute and a conditional prefix representing a condition to verify to execute the at least one first operation,
  evaluating the prefix, and
  executing (or not) the at least one first operation identified in the machine instruction, according to whether the condition is verified or not.

A procedure according to the first aspect optimizes control of instruction execution. It is especially valuable in reducing recourse to branches.

A process according to the first aspect accelerates processing by reducing the number of cycles necessary to execute instructions.

For example, a process according to the first aspect will make it possible to perform searches for matching items in a reduced number of cycles in a computer system.

According to an embodiment, evaluating the prefix includes verifying a value of a predicate register.

The conditional prefix may include:
an identification of the value of the predicate register, and
an identification of a second operation to perform on the value for the verification.

For example, the second operation is a logical operation.

For example again, the operation is an expectation to realize the value.

The second operation can also be an empty operation, the condition being thus always verified.

According to an embodiment, the at least one first operation is a branch to another machine instruction of a code to execute by the processor.

For example, the branch is conditioned by the evaluation of a predicate vector, comprising a plurality of values from one or more predicate registers.

The predicate vector can be evaluated in part.

According to an embodiment, the at least one first operation represents a predicate calculation, the calculation comprising:
the determination of one bit of a calculation register,
the comparison of the determined bit with a predetermined value, and
the writing of a result of the comparison in a predicate register.

For example, the machine instruction comprises the identification of two first operations to execute in parallel.

For example again, the execution of machine instructions by the processor is managed by a processing chain module in which the machine instructions are executed at the execution stage of the processing chain.

Each machine instruction can be executed in one processor cycle.

The machine instructions can be represented by code words whose format is predefined.

A second aspect of the invention concerns a physical processor configured to implement a procedure according to the first aspect of the invention.

For example, such a processor would comprise:
a memory configured to store at least one machine instruction to execute, the machine instruction comprising the identification of at least one first operation to execute and a conditional prefix representing a condition to verify to execute said at least one first operation,
a management module configured to evaluate the prefix and to execute (or not) the at least one first operation identified in the machine instruction, according to whether the condition is verified or not, and
a physical processing unit configured to execute the at least one first operation identified.

The memory can be broadly termed a "machine readable medium."

A third aspect of the invention is directed to a searching device for matching items in a list, comprising a physical processor according to the second aspect. For example, this device is an associative list processing unit, or ALPU.

BRIEF DESCRIPTION OF THE DRAWINGS

The invention's other characteristics and benefits will come clear on reading the detailed description that follows, provided as a non-limitative example, and the appended figures, among which:

FIG. 2 illustrates a branch.

In what follows, a processor architecture according to an embodiment of the invention is described. A highly simplified illustration is given in FIG. 1A. This illustration is aimed at presenting the elements discussed after the description. A person skilled in the art would be able to grasp that other elements are useful to the processor's full operation. These elements are not presented for the sake of concision.

A physical memory 100 (or machine readable medium) stores the machine instructions to execute by the physical processor.

The management of the execution of these instructions is done by a processing chain module 101 (or pipeline).

The execution of the operations necessary for the execution of the instructions is performed by a processing unit 102 of the ALU (arithmetic and logic unit) type. The processing unit can be implemented by a dedicated circuitry to execute the instructions.

The data useful to the execution of the instructions are stored in one or more 103 registers available in reading and/or writing by the processing unit.

Figure 1A:
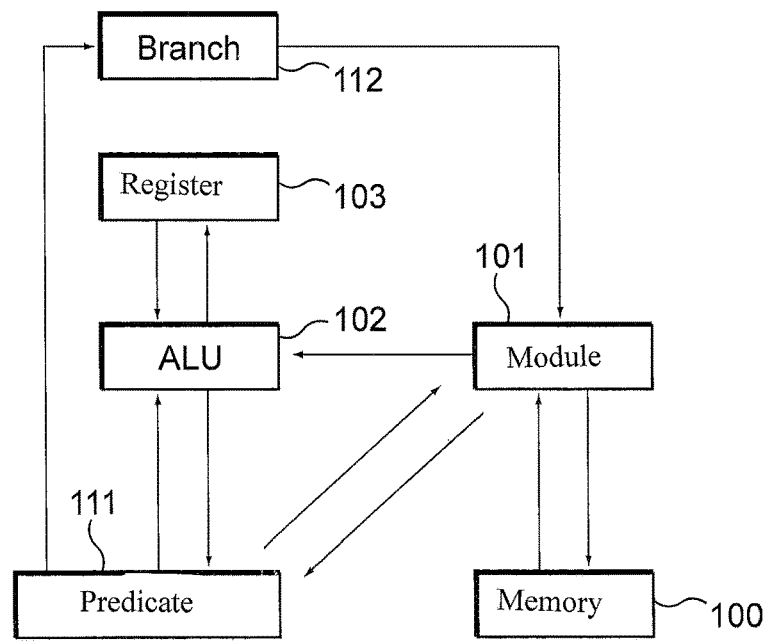
FIG. 1A schematically illustrates a processor according to an embodiment of the invention.
Figure 1B:
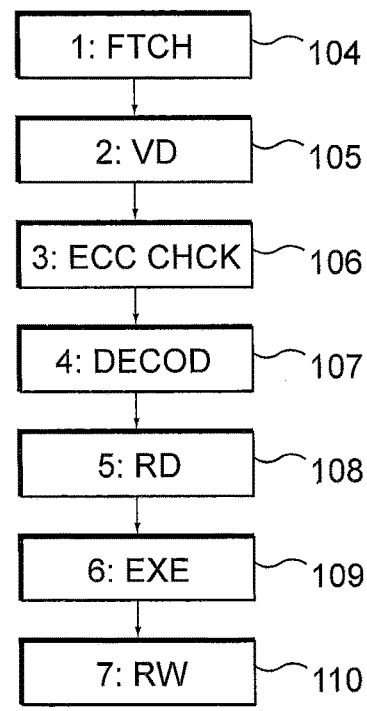
FIG. 1B illustrates the steps of processing an instruction flow according to an embodiment of the invention.

The processing chain module manages the instruction flow in seven "stages" (or steps) of execution, as illustrated by FIG. 1B:

1) the 104 sending of the address of the instruction to execute to the instruction memory,
2) a 105 empty clock cycle to take into account the reading latency of the instruction in memory,
3) the 106 verification of the received instruction, for example, by verifying dedicated bits of an error correction code (ECC),
4) the 107 decoding of the instruction,
5) the 108 reading of instruction operands,
6) the 109 execution of operations, and
7) the 110 writing of the results of the instruction in one or more registers.

Referring to FIG. 1A, to control the execution of instructions by the processing chain module, the processor comprises one or more 111 predicate registers. According to bit values in this register, certain instructions can be executed or not.

Furthermore, the branch on the instructions of the code executed by the processor is generated by a dedicated 112 branch unit.

In the prior art, branching is the technique commonly used to control the execution flow of instructions. However, branching takes up a good deal of the processor cycle. It is proposed here that its use be reduced.

Branching is first described in what follows in reference to FIG. 2.

It is supposed that a set of instructions noted A to Z in a code are to be executed sequentially. In other words, the code comprises instruction A, then instruction B, then instruction C, and so on. It is also supposed that during the execution of the code, certain instructions are to be executed under condition.

For example, if a COND condition is fulfilled, the instruction E directly after instruction D is not executed, but instead instruction O is. The execution of instructions D to N are therefore "jumped." In other words, the code is "branched" to instruction O.

Branching therefore implies not going to instruction E at stage 6 of execution (step 109 in FIG. 1B). However, it also implies emptying all the instructions following instruction E in the processing chain to make way for the entry of instruction O.

In FIG. 2, the content of each stage in the processing chain is represented for different T1 to T16 cycles.

In the first cycle T1, instruction A is requested by the processing chain module. In cycle T2, the response from the instruction memory module is expected. Thus, instruction A goes from stage 1 to stage 2, freeing stage 1. In cycle T2, instruction B can therefore be requested of the instruction memory module.

In cycle T3, instruction A is received and therefore goes to stage 3 for verification. Instruction B stays in wait in stage 2, which frees stage 1 for instruction C.

With every cycle, the instructions make their entry into the processing chain module and successively go through the stages.

In cycle T7, the processing chain is entirely fulfilled. In cycle T8, instruction A leaves the chain.

In cycle T9, branching is requested, for example, following verification of a condition by branch module 112 in predicate register 111. Thus, for example, instruction E should not be executed, but the code continues on from instruction O.

Instruction E is therefore not passed to stage 6, but is replaced by an empty instruction, generally designated "NOP" in cycle T10. Furthermore, instructions I, H, G and F, which must go to stages 2, 3, 4 and 5, are emptied. Instruction J, which should make its entry at stage 1 in cycle T10, is replaced by instruction O (instead of asking for instruction J, the processing chain module asks for instruction O).

Starting with this cycle, the succession of instructions in the stages of the processing chain module continues its normal course.

One can see that it is only in cycle T15 that instruction O reaches stage 6 of execution. The branching of the code therefore requires five cycles.

It is easy to see how branching takes up so many processor cycles and so much execution time. This is the reason why, according to an embodiment of the invention, they should be avoided.

A new structure for controlling the instruction execution flow, one less dependent on branches, is therefore proposed in an embodiment.

Embodiments of the invention do not, however, exclude the use of branches.

It is proposed that the branches to test instruction execution conditions be replaced by conditional prefixes in the processor instructions.

Figure 3A:
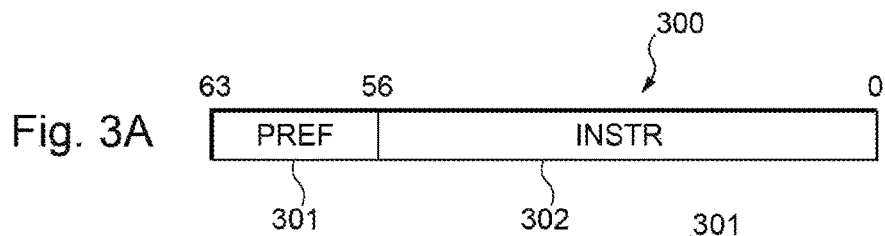
FIGS. 3A-3B and 4A-4G illustrate instructions according to an embodiment of the invention.
Figure 3B:
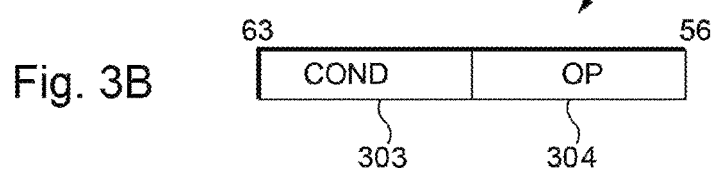

In this way, a new instruction format is proposed, as shown in FIG. 3A. The 300 instructions, according to an embodiment of the invention, comprise two parts: a first 301 part, called "prefix," comprises the condition to verify to execute (or not) the operations contained in part 302. For example, the instructions are coded on 64 bits and a byte (eight bits) is used to code the prefix.

Several types of prefix can be contemplated, The prefix can contain two sub-parts, as illustrated in FIG, 3B: one 304 sub-part identifying the prefix (for example, coded on two bits from 0 to 3) and a 303 sub-part containing the condition to verify.

The prefixes are evaluated at the operand reading stage. Depending on the result obtained, the operation or operations contained in part 302 are executed.

Several types of prefix can be contemplated.

For example, code "0" can identify an empty condition. In this case, the operation or operations contained in part 302 are executed without condition. In an assembly language, the instruction can be written directly. The absence of condition preceding the instruction is therefore equivalent to an empty condition.

Code "1," for example, can identify a wait condition. In this case the operation or operations contained in part 302 are not executed until the condition contained in part 303 is fulfilled. This prefix is therefore equivalent to a branch on a current instruction address. This prefix can be identified by "wait_for" in an assembly language.

For example again, code "2" can identify the verification of the fulfillment of a condition to execute one or more operations contained in part 302 or not to execute an operation. Thus, if condition 303 is true, the operation or operations are executed; if not, the condition is false, and no operation is executed (the instruction is replaced by an empty instruction, generally designated "NOP"). This prefix may be designated by "do_if( )" in an assembly language.

Code "3" can identify the verification of the non-fulfillment of a condition to execute one or more operations contained in part 302 or not to execute an operation. Thus, if condition 303 is false, the instruction or instructions are executed; if not no operation is executed (they are replaced by an empty instruction, generally designated "NOP"), This prefix may be designated by "do_if_not( )" in an assembly language.

The condition in part 303 can be represented by an address of one or more predicate register bits or of a register storing the result of a comparison of a predicate register bit with a fixed value.

FIGS. 4A to 4G show examples of instructions that can be contained in part 302 of the structure shown in FIG. 3A.

Figure 4A:
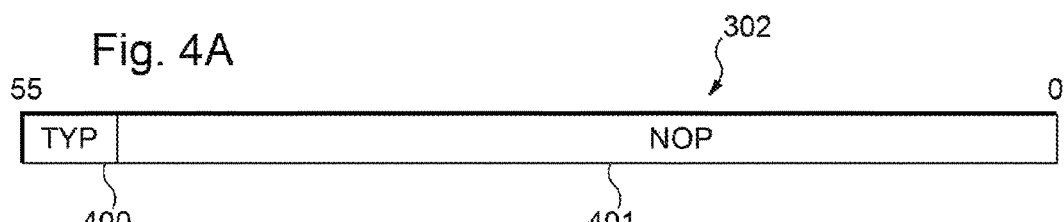

Each instruction is identified by an instruction code in a 400 field,

FIG. 4A shows an empty "NOP" instruction. It being an empty instruction, once identified by the 400 field, the remaining 401 part does not contain any particular information. It is therefore not used.

Figure 4B:
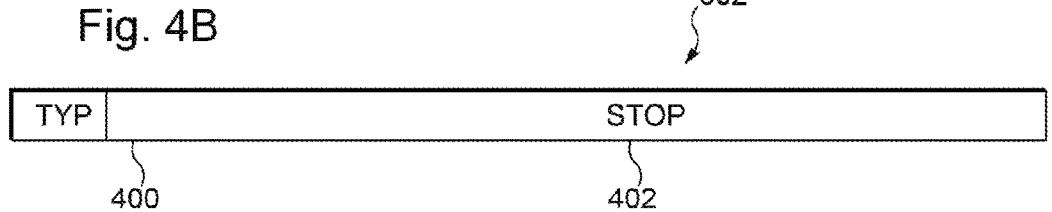

FIG. 4B illustrates a "STOP" instruction. It indicates the end of a program. Once identified by the 400 field, the remaining 402 part does not contain any particular information. It is therefore not used.

Figure 4C:
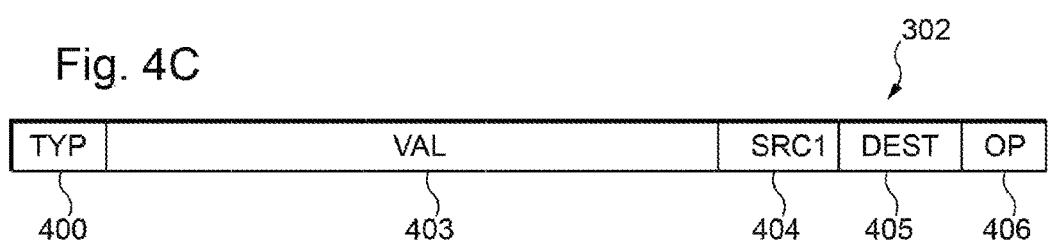

FIG. 4C shows an instruction with an immediate value operand. This is an instruction for which one of the operands is not represented by the memory address that stores them, but rather directly by the value itself, for example, coded on four bytes in a 403 field. The instruction also comprises a 404 field representing the memory address of the second operand, a 405 field representing the memory address at which to store the instruction result, and a 406 field containing the code of the operation to execute per ALU processing unit on the two operands.

Direct coding of an operand requires a good deal of space; the instruction in FIG. 4C does not allow for parallel execution of a number of operations.

Figure 4D:
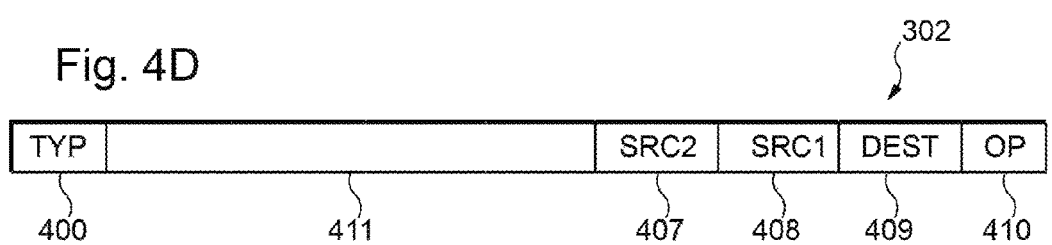

FIG. 4D illustrates a single operation instruction. This is an instruction that will only command a single operation per ALU processing unit. Here the two operands are represented by the memory addresses that store them. The instruction therefore comprises a 407 field representing the memory address of the second operand, a 408 field representing the memory address of the first operand, a 409 field representing the memory address at which to store the instruction result, and a 410 field containing the code of the operation to execute per ALU processing unit on the two operands. The 411 field is unused.

Figure 4E:
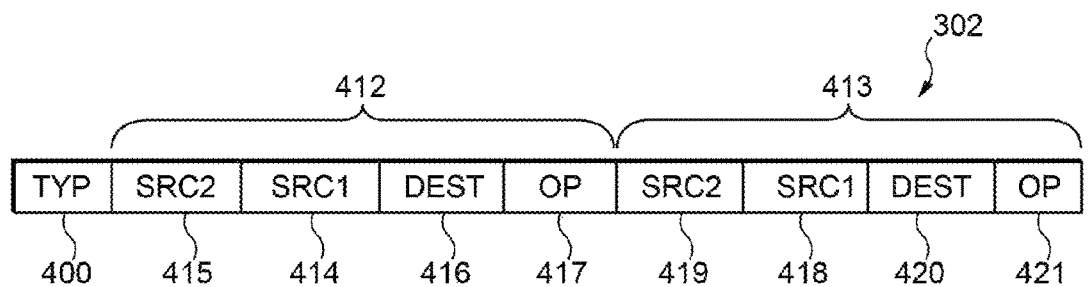

FIG. 4E shows a two-operation instruction. This is an instruction that will command the execution of two operations per ALU processing unit. Each operation is represented by a 412 and 413 field. In the 412 field (resp. 413), a 414 field (resp. 418) represents the memory address of the second operand, a 415 field (resp. 419) represents the memory address of the first operand, a 416 field (resp. 420) represents the memory address at which to store the instruction result, and a 417 field (resp. 421) contains the code of the operation to execute per ALU processing unit on the two operands. It is possible to execute two operations in parallel because the size of the 300 instruction allows for it.

Figure 4F:
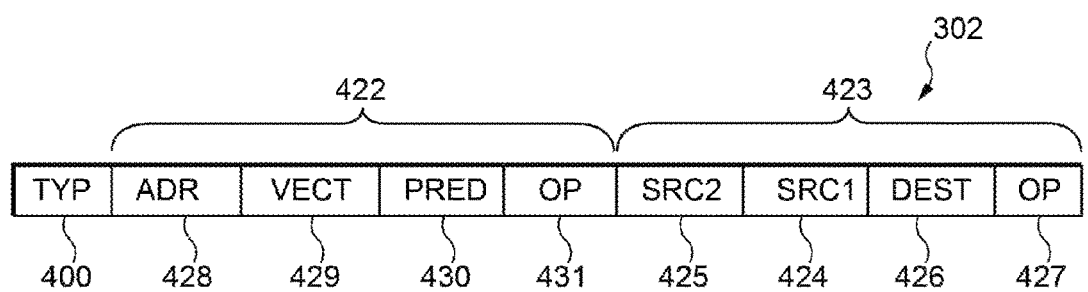

FIG. 4F shows an instruction with a branch and an operation. This is an instruction that will command the execution of a branch by the processing chain module and of one operation per ALU processing unit. The branch is represented by a 422 field, and the operation by a 423 field.

In a 423 field, a 424 field represents the memory address of the second operand, a 425 field represents the memory address of the first operand, a 426 field represents the memory address at which to store the instruction result, and a 427 field contains the code of the operation to execute per ALU processing unit on the two operands.

In the 422 field, a 428 field represents the memory address of the instruction toward which the branch points (the "jump" is performed at this address), a 429 field represents the predicate vector of the predicate register to verify (according to an embodiment of the invention, it is desirable that several predicates can be verified in a single operation, thus a predicate vector is spoken of as described below), a 430 field comprises the target values for the predicate vector (containing the values for which the condition of the branch is considered to be fulfilled), and a 431 field contains the code representing the branch.

It is possible to execute a branch and an operation in parallel because the size of instruction 300 allows for it.

Figure 4G:
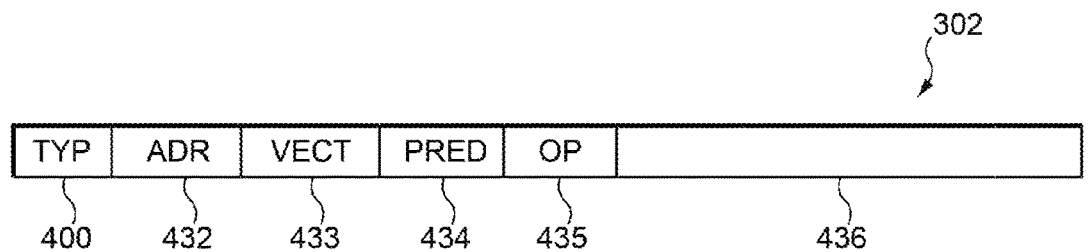

FIG. 4G shows a single-branch instruction. This is an instruction that will only command a branch by the processing chain module.

A 432 field represents the memory address of the instruction toward which the branch points (the "jump" is performed at this address), a 433 field represents the predicate vector of the predicate register to verify (according to an embodiment of the invention, it is desirable that several predicates can be verified in a single operation, thus a predicate vector is spoken of as described below), a 434 field comprises the target values of the predicate vector (containing the values for which the condition of the branch is considered to be fulfilled), and a 435 field contains the code representing the branch. The 436 field is unused.

Other types of instructions can be envisaged. For example, it is possible to contemplate instructions comprising compound operations that allow, for example, combinations of elementary operations of the ALU processing unit to be realized. It is also possible to contemplate combining compound operations with a traditional operation or with a branch or launching two compound operations in parallel in the same instruction.

The use of a conditional prefix as described above gains in processor cycles. The highly simplified example below explains this. We know that a performed branch (fulfilled condition) consumes five cycles, while an unperformed branch (unfulfilled condition) only consumes one cycle.

Let us take the following code, implementing a branch:
CODE_A//
1: op0
// This is the execution of an op0 operation.
2: branch_if_not(p0) L0
// This involves branching the code to line L0 if predicate p0 is false.
3: op1
// This is the execution of an op1 operation. This line is executed when p0 is true.
4: branch L1
// This is a branch unconditional to line L1 because the next line is L0, which should not be executed if p0 is true.
5: L0: op2
// This is the execution of an op2 operation.
6: L1: op3
// This is the execution of an op3 operation.

The code above therefore consists in executing op0, then, depending on whether p0 is false or true:
op2 then op3 (p0 false), or
op1 then op3 (p0 true).

In terms of cycles, in the case where p0=false, eight cycles are therefore consumed:
one cycle for op0,
five cycles for the branch created in line 2,
one cycle for op2,
one cycle for op3.

In terms of cycles, in the case where p0=true, nine cycles are therefore consumed:
one cycle for op0,
one cycle for the branch not created in line 2,
one cycle for op1,
five cycles for the branch created in line 4,
one cycle for op3.

Now let us take the next code, to execute the same program, but with conditional instructions with a prefix as discussed above:
CODE_B//
1: op0
// This is the execution of the op0 operation.
2: do_if_(p0), op1
// This involves executing an op1 operation on condition that p0 is true. In the example in FIG. 3A, the 301 field would comprise the address of predicate p0, and the code of the IF operation of the ALU processing unit. The 302 field would comprise the representation of operation opt. One could also use the models in FIG. 4D or 4C if the processor can implement large instructions with operations in parallel.
3: do_if_not(p0), op2
// This involves executing operation op1 on condition that p0 is false
4: op3
// This is the execution of operation op3.

One can see already that the writing of the code is simplified. This code does not comprise more than four lines, compared to six previously. It also does not use branching.

In terms of cycles, in the case where p0=false, four cycles are consumed:
one cycle for op0,
one cycle for the conditional instruction in line 2,
one cycle for the conditional instruction in line 3,
one cycle for op3.

In terms of cycles, in the case where p0=true, four cycles are again consumed.

With a processor according to an embodiment of the invention, the same program can therefore be executed far more quickly.

According to an embodiment of the invention, it is possible to accelerate program execution even more.

To do this, a bit-to-bit comparison operation is introduced that will enable one bit of a register to be tested to write the result in a predicate register.

In fact, given the fact that this type of comparison is so often implemented to obtain the value of the condition to test (p0 in the example above), it is beneficial to put a dedicated operation at the processor's disposal.

Such an operation could be written: cmp_bit_1_to_reg2 [28], p0. This operation compares the bit in position 28 of register reg2 to the value "1" and writes the result ("1" for true, "0" for false) in predicate p0. It therefore takes as operands the value of the position of the bit to test (28), the address of register reg2 and the address of predicate p0.

In a traditional processor, two cycles are required to achieve the same result:

1: and reg2, 0x10000000, reg0
// This involves performing an AND logic operation between the content of register reg2 with the value 28 (in hexadecimal) and to store the result in register reg0
2: cmp_neq_to reg0, 0, p0
// This instruction compares the content of register reg0 to 0 and stores the result in predicate p0. Thus, if reg0 is different from 0, p0 is true, and if reg0 is 0, p0 is false.

In the code example CODE_A given above, two predicates are used, p0 and p1. Four cycles are therefore required in this code to obtain their values.

By using a dedicated operation (of the type cmp_bit_1_to_reg2[28], p0), this number can be reduced to two.

It is even possible to reduce this number to a cycle if the processor allows for instructions with operations in parallel.

Thus, instead of writing the obtaining of predicates p0 and p1 as follows:

1: and reg2, 0x10000000, reg0
// The value of the bit in position 28 of register reg2 is obtained and stored in reg0.
2: and reg2, 0x1000000000000000, reg1
// The value of the bit in position 56 of register reg2 is obtained and stored in reg0.
3: cmp_neq_to reg0, 0, p0
// This instruction compares the content of register reg0 to 0 and stores the result in predicate p0. Thus, if reg0 is different from 0, p0 is true, and if reg0 is 0, p0 is false.
4: cmp_eq_to reg1, 0, p1
// This instruction compares the content of register reg1 to 0 and stores the result in predicate p1. Thus, if reg1 is 0, p1 is true, and if reg0 is different from 0, p1 is false.

It is possible to write this on a single line

1: cmp_bit_1_to_reg2[28], p0||cmp_bit_0_to_reg2[56], p1
// the vertical double bar means that the operations are executed in parallel.

The parallel execution of operations is possible here because the direct values of the position to test in the register is not manipulated (which is not the case with the prior art). The use of direct values prohibits parallel operations because they require a high number of bits (as explained in reference to FIG. 4C).

As already mentioned above, the use of prefixed conditional instructions does not preclude the use of branches. An embodiment of the invention nevertheless makes improvements on known branches.

Still with the same goal of gaining in processor cycles, it is proposed that branches be created on predicate vectors in order to test a number of conditions at the same time.

Such a branching instruction can be written: branch_if_veq(abcd), L0. This involves making the branch at the instruction indicated in line L0 if the predicate vector {p3, p2, p1, p0} is equal to {a, b, c, d}. The parameters a, b, c and d can take the values 0 or 1 or even x if it is not necessary to perform the test on one of the predicates. For example, if the condition only applies to predicates p0 and p1, an instruction of the following type can be written: branch_if_veq(xxcd), L0.

Below, different characteristics described above are combined in a same code to gain in processor cycles. To start, a code will be presented as it would be written and executed according to the prior art. An optimized code will then be presented, one that saves on cycles while carrying out the same operations.

Let us consider the following code, written with instructions according to the prior art:

CODE_C //
1: op1||op2
// Operations op1 and op2 are executed in parallel
2: and reg2, 0x10000000, reg0
// The value of the bit in position 28 (in hexadecimal) of register reg2 is obtained and stored in reg0.
3: and reg2, 0x1000000000000000, reg1
// The value of the bit in position 56 of register reg2 is obtained and stored in reg0.
4: cmp_neq_to reg0, 0, p0
// This instruction compares the content of register reg0 to 0 and stores the result in predicate p0. Thus, if reg0 is different from 0, p0 is true, and if reg0 is 0, p0 is false.
5: cmp_eq_to reg1, 0, p1
// This instruction compares the content of register reg1 to 0 and stores the result in predicate p1. Thus, if reg1 is 0, p1 is true, and if reg1 is different from 0, p1 is false.
6: op3||op4
// Operations op3 and op4 are executed in parallel
7: branch_if_not(p0) L0
// The code is branched at line L0 if predicate p0 is false.
8: op5
// Operation op5 is executed. This line is executed when p0 is true.
9: branch L1
// This is an unconditional branch at line L1 because the next line is L0, which should not be executed if p0 is true
10: L0: op6
// An op6 operation is executed
11: L1: op7
// An op7 operation is executed
12: branch_if_not(p1) L2
// The code is branched at line L2 if predicate p1 is false.
13: op8
// Operation op8 is executed. This line is executed when p1 is true.
14: branch L3
// This is an unconditional branch at line L3 because the next line is L2, which should not be executed if p1 is true
15: L2: op9
// An op9 operation is executed
16: L3: op10
// An op10 operation is executed
17: or, p0, p1, p2

Predicate p2 is calculated by an OR logic between p0 and p1

18: branch_if_not(p2) L4
// The code at line L4 is branched if predicate p2 is false.
19: op11
// Operation op11 is executed. This line is executed when p2 is true.
20: stop
// End of program, except if it is branched on L4
21: L4: op12
// An op12 operation is executed The code CODE_C therefore comprises the calculation of three predicates, p0, p1 and p2, and three conditional branches. It also comprises simple operation executions and parallel executions (marked by the || sign).

Knowing that a conditional branch performed consumes five cycles and that a branch not performed (because its condition is not fulfilled) only consumes one, one can determine that in the case where p0=true and p1=false (and vice versa), this code is executed in 25 cycles (the stop is also considered to consume only one cycle). For p0=p1=true or false, this code is executed in 24 cycles.

Here is the writing of the code using prefixed conditional instructions and the comparison and branching instructions mentioned in the description above:

CODE_D //
1: op1||op2
// Operations op1 and op2 are executed in parallel
2: cmp_bit_1_to_reg2[28], p0||cmp_bit_0_to_reg2[56], p1
// Lines 2, 3, 4 and 5 of code CODE_C are here condensed into a single line and instruction (with two parallel operations).
3: op3 op4
// Operations op3 and op4 are executed in parallel.
4: do_if_(p0), op5
// Op5 is executed if p0 is true.
5: do_if_not(p0), op6
// Op6 is executed if p0 is false.
6: op7
// Operation op7 is executed.
7: do_if_(p1), op8
// Op8 is executed if p1 is true.
8: do_if_not(p1), op9
// Op9 is executed if p1 is false.
6: op10
// Operation op10 is executed.
7: branch_if_veq(xx00) LAB0
// The code is branched at line LAB0 if predicates p1 and p0 are false. Note that this approach avoids performing the OR in line 17 of code CODE_C.
9: op11
// Operation op11 is executed. This line is executed when p1 or p2 is true.
10: stop
// End of program, except if it is branched on LAB0
11: LAB0: op12
// An operation op12 is executed.

Note that the code here is more compact; it numbers only 11 lines of instruction compared to 21 for code C.

In the worst case (p1=p0=false), where the branch is performed, the code CODE_D is executed in 15 cycles, which is far less than the 24 cycles of the best case for code CODE_C.

Having described and illustrated the principles of the invention with reference to various embodiments, it will be recognized that the various embodiments can be modified in arrangement and detail without departing from such principles. It should be understood that the devices, modules, processors, processing units, programs, processes, or methods described herein are not related or limited to any particular type of computing environment, unless indicated otherwise. Various types of specialized computing environments may be used with or perform operations in accordance with the teachings described herein. Elements of embodiments shown in software may be implemented in hardware and vice versa.

Execution of the sequences of machine instructions contained in the memory causes the processor or processing unit to perform at least some of the process steps or function(s) of the procedures described herein. One or more physical processors or physical processing units in a multi-processing arrangement may also be employed to execute the sequences of instructions contained in the memory or machine/computer readable medium. In alternative embodiments, hardwired circuitry may be used in place of or in combination with software instructions.

The term "computer readable medium" or "machine readable medium" as used herein refers to any medium that participates in providing instructions to a processor or processing unit for execution. Such a medium is non-transitory and may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer/machine readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer/machine readable media may be involved in carrying one or more sequences of one or more instructions to processor for execution.

Computer programs comprising machine executable instructions for implementing at least one of the steps of the method described herein or function(s) of various elements of the structural arrangement can be implemented by one or more computers comprising at least an interface, a physical processor and a non-transitory memory (also broadly referred to as a non-transitory machine readable or storage medium). The computer is a special purpose computer as it is programmed to perform specific steps of the method(s) described above. The non-transitory memory is encoded or programmed with specific code instructions for carrying out the above method(s) and its/their associated steps. The non-transitory memory may be arranged in communication with the physical processor so that the physical processor, in use, reads and executes the specific code instructions embedded in the non-transitory memory. The interface of the special purpose computer may be arranged in communication with the physical processor and receives input parameters that are processed by the physical processor.

It will be appreciated by one skilled in the art that the disclosed arrangements and methods described herein represent a solution to the technological problem currently faced by designers of processors dedicated to implementing item searches in lists.

The present invention has been described and illustrated in this detailed description and in the attached figures.

However, this invention is not limited to the described embodiments. Other variants and methods of realization can be deduced and implemented by a person skilled in the art on reading the present description and the appended figures.

In the claims, the term "comprise" does not exclude other elements or other steps. The indefinite article "a" does not exclude the plural. The various features presented and/or claimed can be advantageously combined. Their presence in the description or in different dependent claims does not exclude this possibility. The reference signs should not be construed as limiting the scope of the invention.

The invention claimed is:

1. A computer implemented method for processing machine instructions by a physical processor, comprising:
   receiving, from a memory, at least one machine instruction, wherein the at least one machine instruction comprises a first identification of first and third operations to execute and a conditional prefix representing a condition for verifying whether to execute at least the first and third operations, wherein the conditional prefix comprises:
      a second identification of a value of a predicate register, and
      a third identification of a second operation to perform on the value of the predicate register for the verification, wherein the second operation comprises a wait until the value of the predicate register is met;
   executing, using a processing unit, a comparison instruction, a resulting value of which is stored in the predicate register of the received machine instructions such that the value of the predicate register is met;
   evaluating, using a management module, the conditional prefix, wherein evaluating the conditional prefix comprises the verification of the value of the predicate register;
   executing, using a processing unit, the first operation identified in the at least one machine instruction, according to whether the condition is verified; and
   executing the third operation identified in the at least one machine instruction, according to whether the condition is verified.

2. The computer implemented method according to claim 1, wherein, the first or third operation is a branch to another machine instruction of a code to execute by the processor.

3. The computer implemented method according to claim 2, wherein the branch is conditioned by the evaluation of a predicate vector, comprising a plurality of values of one or more predicate registers.

4. The computer implemented method according to claim 3, wherein the predicate vector is evaluated in part.

5. The computer implemented method according to claim 1, wherein the first or third operation represents a predicate calculation, the calculation comprising:
   determining a bit of a calculation register,
   comparing the determined bit with a predetermined value, and
   writing a result of the comparison in a predicate register.

6. The computer implemented method according to claim 1, wherein the at least one machine instruction comprises a fourth identification of two first operations to execute in parallel.

7. The computer implemented method according to claim 1, wherein the execution of machine instructions by the processor is managed by a processing chain module and wherein said machine instructions are executed in an execution stage of said processing chain module.

8. The computer implemented method according to claim 7, wherein each machine instruction is executed in a processor cycle.

9. The computer implemented method according to claim 1, wherein said at least one machine instruction is represented by code words whose format is predefined.

10. A physical processor comprising:
    a memory configured to store at least one executable machine instruction, the at least one machine instruction comprising a first identification of first and third operations to execute and a conditional prefix representing a condition for verifying whether to execute at least the first and third operations, wherein the conditional prefix comprises:
       a second identification of a value of a predicate register, and
       a third identification of a second operation to perform on the value of the predicate register for the verification, wherein the second operation comprises a wait until the value of the predicate register is met;
    a processing unit configured to execute a comparison instruction, a resulting value of which is stored in the predicate register of the machine instructions such that the value of the predicate register is met;
    a management module configured to evaluate the conditional prefix and to determine whether to execute the first and third operations identified in the at least one machine instruction according to whether the condition is verified, wherein evaluating the conditional prefix comprises the verification of the value of the predicate register; and
    the processing unit configured to execute the identified first operation and the identified third operation.

11. The computer implemented method according to claim 1, further comprising:
    receiving, from the memory, another machine instruction, wherein the other machine instruction comprises a fourth identification of at least one fourth operation to execute and another conditional prefix representing another condition for another verifying whether to execute the at least one fourth operation, wherein the other conditional prefix comprises:
       a fifth identification of another value of another predicate register, and
       a sixth identification of a fifth operation to perform on the other value of the other predicate register for the other verification, wherein the fifth operation comprises a logical operation;
    evaluating, using the management module, the other conditional prefix, wherein evaluating the other conditional prefix comprises the verification of the other value of the other predicate register; and
    executing, using the processing unit, the at least one fourth operation identified in the other machine instruction, according to whether the other condition is verified or not.

12. The computer implemented method according to claim 1, further comprising:
    receiving, from the memory, another machine instruction, wherein the other machine instruction comprises a fourth identification of at least one fourth operation to execute and another conditional prefix representing another condition for another verifying whether to execute the at least one fourth operation, wherein the other conditional prefix comprises:
       a fifth identification of another value of another predicate register, and a sixth identification of a fifth operation to perform on the other value of the other predicate register for the other verification, wherein the fifth operation comprises an empty operation, the other condition being thus always verified;

evaluating, using the management module, the other conditional prefix, wherein evaluating the other conditional prefix comprises the verification of the other value of the other predicate register; and executing, using the processing unit, the at least one fourth operation identified in the other machine instruction, according to whether the other condition is verified or not.

13. The computer implemented method according to claim 1, wherein the physical processor is dedicated to matching items in a list.

14. The computer implemented method according to claim 13, wherein the physical processor supports a message passing interface (MPI).

15. A computer implemented method for processing machine instructions by a physical processor, comprising:

receiving, from a memory, at least one machine instruction, wherein the at least one machine instruction comprises a first identification of first and third operations to execute and a conditional prefix representing a condition for verifying whether to execute at least the first and third operations, wherein the conditional prefix comprises:

a second identification of a value of a predicate register and a third identification of a second operation to perform on the value of the predicate register for the verification;

executing, using a processing unit, a comparison instruction, a resulting value of which is stored in the predicate register of the received machine instructions such that the value of the predicate register is met;

evaluating, using a management module, the conditional prefix, wherein evaluating the conditional prefix comprises the verification of the value of the predicate register;

executing, using a processing unit, the first operation identified in the at least one machine instruction, according to whether the condition is verified or not; and after executing the first operation, executing the third operation identified in the at least one machine instruction, according to whether the condition is verified or not.

* * * * *